(12) United States Patent
Chen et al.

(10) Patent No.: US 10,372,026 B2
(45) Date of Patent: Aug. 6, 2019

(54) OPTICAL FIXING DEVICE, LIGHT SOURCE DEVICE, AND PROJECTION EQUIPMENT

(71) Applicant: Appotronics Corporation Limited, Shenzhen (CN)

(72) Inventors: Yongzhuang Chen, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 15/773,907

(22) PCT Filed: Nov. 4, 2016

(86) PCT No.: PCT/CN2016/104716
§ 371 (c)(1),
(2) Date: May 4, 2018

(87) PCT Pub. No.: WO2017/080407
PCT Pub. Date: May 18, 2017

(65) Prior Publication Data
US 2018/0321575 A1   Nov. 8, 2018

(30) Foreign Application Priority Data

Nov. 10, 2015 (CN) .......................... 2015 1 0762819
Dec. 10, 2015 (CN) .......................... 2015 1 0918356

(51) Int. Cl.
| G03B 21/14 | (2006.01) |
| G03B 21/20 | (2006.01) |
| H04N 9/31  | (2006.01) |

(52) U.S. Cl.
CPC .......... *G03B 21/204* (2013.01); *H04N 9/317* (2013.01); *H04N 9/3114* (2013.01);
(Continued)

(58) Field of Classification Search
CPC .... G03B 21/204; G03B 21/145; H04N 9/317; G02B 26/008
See application file for complete search history.

(56) References Cited

U.S. PATENT DOCUMENTS

| 9,442,351 B2 | 9/2016 | Lin et al. |
| 2013/0038841 A1* | 2/2013 | Zakoji ................ G03B 21/2013 353/30 |

FOREIGN PATENT DOCUMENTS

| CN | 101446749 A | 6/2009 |
| CN | 101770078 A | 7/2010 |

(Continued)

OTHER PUBLICATIONS

International Search Report for PCT/CN2016/104717 dated Jan. 26, 2017, 3 pages.

*Primary Examiner* — Sultan Chowdhury
*Assistant Examiner* — Magda Cruz
(74) *Attorney, Agent, or Firm* — SEED INTELLECTUAL PROPERTY LAW GROUP LLP

(57) ABSTRACT

An optical fixing device includes light source fixing parts for fixing a plurality of solid state light sources, a second light combination element fixing part for fixing at least one second light combination element, a condenser lens fixing part for fixing a condenser lens, and second reflecting mirror fixing parts arranged in accordance with at least part of the plurality of solid state light sources for fixing second reflecting mirrors. The second light combination elements are used for transmitting some light emitted from the solid state light sources and is not reflected and/or are used for reflecting light reflected by the second reflecting mirrors. The condenser lens is used for converging the light passing through the second light combination elements. The optical fixing device is compact in size and shape with low production (Continued)

cost, providing high accuracy for the relative positioning of the optical elements.

11 Claims, 2 Drawing Sheets

(52) U.S. Cl.
CPC ......... *H04N 9/3164* (2013.01); *H04N 9/3173* (2013.01); *H04N 9/3161* (2013.01)

(56) References Cited

FOREIGN PATENT DOCUMENTS

| CN | 202041758 U | 11/2011 |
|---|---|---|
| CN | 104516178 A | 4/2015 |
| CN | 205176463 U | 4/2016 |
| CN | 205539892 U | 8/2016 |
| EP | 2874004 A1 | 5/2015 |

\* cited by examiner

OPTICAL FIXING DEVICE, LIGHT SOURCE DEVICE, AND PROJECTION EQUIPMENT

BACKGROUND

Technical Field

The present disclosure relates to the optical field, and in particular, to an optical fixing device, a light source device, and a projection equipment.

Background Art

An existing light source device 101 using RGB three-color LEDs as light sources includes LED light source devices 102, 103, and 104, coated glass sheets 105, 106, and 107, a condenser lens 108, and a light pipe 109.

As illustrated in FIG. 1, the LED light source devices 102, 103, and 104 emit red light, green light, and blue light, which pass through the coated glass sheets 105, 106, and 107 and the condenser lens 108 to generate white light, and converge onto the light pipe 109 so as to provide the needed light source. However, current LED light source devices are large in overall size and shape and need to be arranged in horizontal and vertical directions. As such, the overall outer dimension of the light source device 101 is large. In addition, there are many optical elements located along the optical paths of the LED light source devices, which require high positioning accuracy. The optical elements in the existing light source device 101, however, are mounted on different fixing parts respectively. As a result, in order to ensure accuracy of relative locations of the fixing parts, the requirement for manufacturing precision of the different fixing parts is high, thus increasing the production cost.

BRIEF SUMMARY

To overcome defects in the prior art, the present disclosure provides an optical fixing device that is compact in size and shape, high in accuracy of relative locations of optical elements, and low in production cost. The present disclosure provides projection equipment having an optical fixing device, and further provides a light source device.

In at least one embodiment of the present disclosure, the optical fixing device comprises: light source fixing parts used for fixing a plurality of solid state light sources; second reflecting mirror fixing parts arranged in accordance with at least part of the plurality of solid state light sources, the second reflecting mirror fixing parts being used for fixing second reflecting mirrors; a second light combination element fixing part used for fixing at least one second light combination element, wherein the second light combination element is used for transmitting some light emitted from the solid state light sources and is not reflected and/or is used for reflecting light reflected by the second reflecting mirrors; and a condenser lens fixing part used for fixing a condenser lens, the condenser lens being used for converging the light passing through the second light combination element.

In various embodiments, the optical fixing device further comprises a first reflecting mirror fixing part used for fixing a first reflecting mirror, and a first light combination element fixing part used for fixing a first light combination element, the first light combination element further reflecting the light reflected by the first reflecting mirror to the second light combination element.

In various embodiments, there are a plurality of second reflecting mirrors, and the light source fixing parts are arranged on a horizontal plane. In the horizontal direction, the first reflecting mirror and the first light combination element located at a first side of the second light combination element are fixed to be perpendicular to the second light combination element, respectively, and the second reflecting mirrors located at a second side of the second light combination element are fixed to be parallel to the second light combination element. Moreover, an acute angle between the second light combination element and the horizontal plane is 45°.

In various embodiments, the optical fixing device further comprises a third reflecting mirror fixing part used for fixing a third reflecting mirror, and the solid state light sources are LED light sources.

In various embodiments, the optical fixing device further comprises a third reflecting mirror fixing part used for fixing a third reflecting mirror and a color wheel fixing part used for fixing a color wheel. The third reflecting mirror reflects converged laser light to the color wheel to excite a wavelength conversion material of the color wheel, and the solid state light sources are laser light sources or LED light sources.

In various embodiments, the third reflecting mirror fixing part comprises a rib extending toward the color wheel, and the third reflecting mirror is obliquely fixed on the rib with respect to the color wheel.

In various embodiments, the optical fixing device is approximately funnel-shaped. The light source fixing parts are arranged at the funnel opening, and the first reflecting mirror fixing part and the second reflecting mirror fixing part are respectively arranged on a pair of internal oblique surfaces of the funnel. The condenser lens is fixed at the neck of the funnel, and the first light combination element fixing part and the second light combination element fixing part are arranged between the funnel opening and the neck. The third reflecting mirror fixing part and the color wheel fixing part are arranged at the end portion of the funnel opposite to the funnel opening. A plate is disposed at the funnel opening, and a plurality of through holes used as the light source fixing parts are provided on the plate.

In various embodiments, at least one of the first reflecting mirror fixing part, the second reflecting mirror fixing part, the third reflecting mirror fixing part, the first light combination element fixing part, and the second light combination element fixing part comprises at least two bosses, and a hollow portion fillable with an adhesive is provided between the adjacent bosses.

In various embodiments, the optical fixing device is integrally formed.

In at least one embodiment of the present disclosure, a projection equipment comprises the optical fixing device according to any of the embodiments described above.

In at least one embodiment of the present disclosure, a light source device comprises a light source queue, a condensing system, a third reflecting mirror, and a wavelength conversion device comprising a color wheel and a driving apparatus. The light source queue is formed with a plurality of light sources arranged in a straight line. The condensing system is located in a light exit direction of the light source queue and condenses the light emitted from the light source queue to the third reflecting mirror. The third reflecting mirror reflects the condensed light onto the color wheel. The color wheel generates excited light after being excited by the light reflected by the third reflecting mirror. The driving apparatus comprises a driving part and a rotation shaft, wherein the rotation shaft is fixedly connected to the color wheel, and the driving part drives the rotation shaft to rotate, so as to drive the color wheel to rotate. The rotation shaft of the driving apparatus is parallel to the light source queue.

In various embodiments, more than 50% of the projection of the wavelength conversion device on the straight line where the light source queue is located overlaps with the light source queue.

In various embodiments, the color wheel is perpendicular to the rotation shaft, and an intersection of the plane where the color wheel is located and the light source queue is located in the middle of the light source queue.

In various embodiments, the third reflecting mirror and the driving apparatus are located at the same side of the color wheel.

In various embodiments, the rotation shaft is slimmer than the driving part, and the third reflecting mirror is at least partially located in a space enclosed by the driving part, the rotation shaft, and the color wheel.

In various embodiments, the light source queue comprises a first light source and a second light source. The first light source emits first light, and the second light source emits second light. The number of the first light sources is greater than or equal to one, and the number of the second light sources is greater than or equal to one. The condensing system comprises a second light combination element, a second reflecting mirror, and a condenser lens. The second light combination element is located on an emission light path of at least one of the first light sources, and the second reflecting mirror is arranged beside the second light combination element. The second light combination element has a characteristic of transmitting the first light and reflecting the second light, and the second light combination element combines the first light and the second light incident thereon. The first light emitted from at least one of the first light sources is directly transmitted by the second light combination element, and the second light emitted from at least one of the second light sources is reflected by the second reflecting mirror onto the second light combination element, and is then reflected by the second light combination element onto the condenser lens. The condenser lens is located on an emission light path of the second light combination element, and the condenser lens converges the light incident thereon to the third reflecting mirror.

In various embodiments, the number of the second reflecting mirrors is greater than one. The second reflecting mirrors are arranged into a second reflecting mirror array in a step shape, wherein each of the second reflecting mirrors is arranged in accordance with one of the second light sources to reflect the second light emitted from the corresponding second light source onto the second light combination element, and the second reflecting mirror array gradually gets closer to the second light combination element along the light exit direction of the light source queue.

In various embodiments, the condensing system further comprises a first reflecting mirror and a first light combination element, wherein the first reflecting mirror is arranged beside the second light combination element, and the first reflecting mirror and the second reflecting mirror are located at the opposite side of the second light combination element. The first light combination element and the second light combination element are cross-arranged, wherein the first light combination element and the first reflecting mirror are located at the same side of the second light combination element, and the first light combination element is arranged between two emission light paths of light sources in the light source queue, without blocking the light emission of the light source queue. The first light combination element has a characteristic of reflecting the first light. The first light emitted from at least one of the first light sources passes through the first reflecting mirror and is reflected onto the first light combination element, and is further reflected by the first light combination element onto the condenser lens.

In various embodiments, the first light combination element and the second light combination element are arranged into a shape of T.

In various embodiments, the first light source further comprises a light source that emits first light from a channel between the first reflecting mirror and the first light combination element. The first light emitted from the light source is transmitted by the second light combination element and is incident onto the condenser lens, or is not transmitted by the second light combination element but is directly incident onto the condenser lens.

In various embodiments, the first light emitted from the first light source and the second light emitted from the second light source have different polarization states. The second light combination element is a polarizer transmitting one of the first light and second light in a polarization state while reflecting the light in the other polarization state.

In at least one embodiment of the present disclosure, a light source device comprises a light source queue formed with a plurality of light sources arranged in a straight line. The light source queue comprises a first light source and a second light source, the first light source emitting first light, and the second light source emitting second light; and a first light combination element and a second light combination element, the first light combination element having a characteristic of reflecting the first light, the second light combination element having a characteristic of transmitting the first light and reflecting the second light. The second light combination element is arranged on an emission light path of at least one of the first light sources in the middle of the light source queue, and transmits the first light emitted from the at least one of the first light sources onto a condenser lens. The first light combination element and the second light combination element are cross-arranged, wherein the first light combination element is arranged between two emission light paths of the light sources in the light source queue, without blocking the light emission of the light source queue. A first reflecting mirror is arranged at first sides of the first light combination element and the second light combination element, wherein the first reflecting mirror and the first light combination element are located at the same side of the second light combination element, and is used for reflecting first light emitted from at least one first light source located at the first end of the light source queue onto the first light combination element. The first light combination element reflects the first light to the condenser lens. A second reflecting mirror is arranged at second sides of the first light combination element and the second light combination element, and is used for reflecting second light emitted from at least one second light source located at the second end of the light source queue to the second light combination element. The second light combination element reflects the second light onto the condenser lens. The condenser lens is used for condensing the light incident thereon.

In various embodiments, the number of the second reflecting mirrors is greater than one. The second reflecting mirrors are arranged into a second reflecting mirror array in a step shape, wherein each of the second reflecting mirrors is arranged in accordance with one of the second light sources to reflect the second light emitted from the corresponding second light source onto the second light combination element, and the second reflecting mirror array gradually gets closer to the second light combination element along the light exit direction of the light source queue.

In various embodiments, the number of the first reflecting mirrors is greater than one. The first reflecting mirrors are arranged into a first reflecting mirror array in a step shape, wherein each of the first reflecting mirrors is arranged in accordance with one of the first light sources to reflect the first light emitted from the corresponding first light source onto the first light combination element, and the first reflecting mirror array gradually gets closer to the first light combination element along the light exit direction of the light source queue.

In various embodiments, the first light combination element and the second light combination element are arranged in a T-shape.

In various embodiments, the first light source further comprises a light source that emits first light from a channel between the first reflecting mirror and the first light combination element. The first light emitted from the light source is transmitted by the second light combination element and is incident onto the condenser lens, or is not transmitted by the second light combination element but is directly incident onto the condenser lens.

In various embodiments, the first light emitted from the first light source and the second light emitted from the second light source have different polarization states. The second light combination element is a polarizer transmitting one of the first light and second light in a polarization state while reflecting the light in the other polarization state.

As can be seen, an optical fixing device provided by the present disclosure has a plurality of types of optical elements mounted and fixed thereon. The optical fixing device, compact in size and shape, accurately fixes relative locations of the optical elements. Moreover, the solution provided in the present disclosure helps to reduce the production cost of the optical fixing device. The solution provided in the present disclosure solves the technical problems in the prior art, including the large overall outer dimension of a light source device, difficulty in ensuring the positioning accuracy of optical elements in the light source device, and the high production cost.

DETAILED DESCRIPTION

In what follows, the present disclosure is further described in detail by using specific embodiments with reference to the accompanying drawings.

Figure 1:
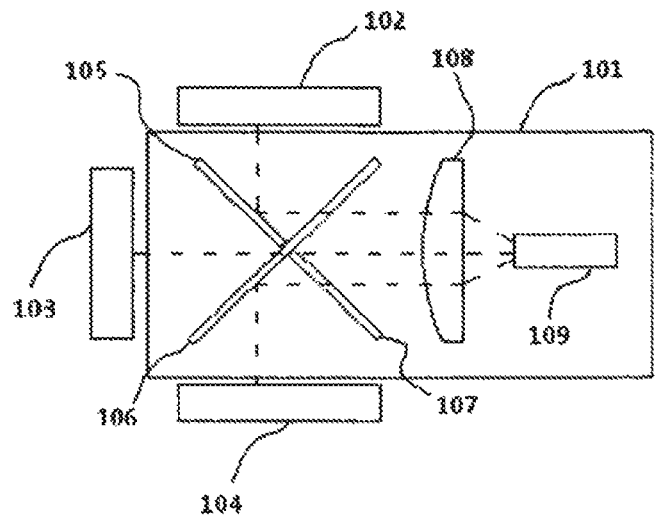
FIG. 1 is a schematic structural diagram of an existing light source device.
Figure 2:
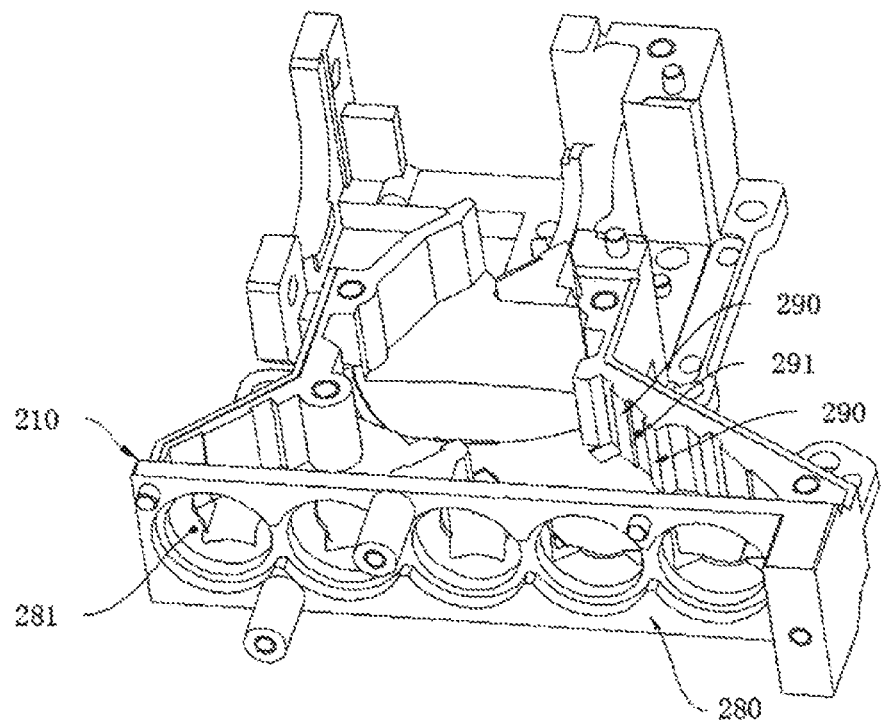
FIG. 2 is a front view of a light source fixing device according to the present disclosure.
Figure 3:
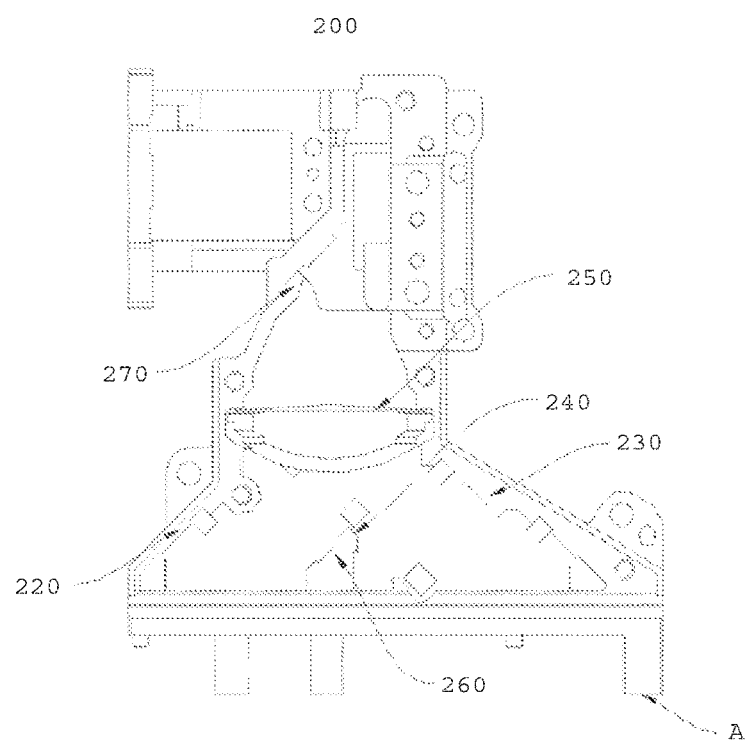
FIG. 3 is a top view of a light source fixing device according to the present disclosure.

Please refer to FIG. 2 and FIG. 3. The present disclosure provides an optical fixing device 200. The optical fixing device 200 is used for compactly fixing various kinds of optical elements thereon, to enable a reduction of the size and shape of the optical fixing device 200 and a projection equipment including the optical fixing device 200 as much as possible. It should be noted that "the optical element" described in the present disclosure is a general name used to refer to a solid state light source, an optical lens, a lens, and the like. The optical fixing device 200 is further illustrated in the following. The optical fixing device 200 includes light source fixing parts 210, first reflecting mirror fixing parts 220, second reflecting mirror fixing parts 230, a second light combination element fixing part 240, and a condenser lens fixing part 250. Preferably, a plurality of solid state light sources are arranged horizontally in a straight line to acquire higher degree of luminance. The light source fixing parts 210 are used for fixing the plurality of solid state light sources. The solid state light sources may include laser light sources or RGB three-color LED light sources (which will be further illustrated later). The second reflecting mirror fixing parts 230 are used for fixing second reflecting mirrors arranged in accordance with a part of the solid state light sources. In at least one implementation, light emitted from a part of the solid state light sources is reflected by the second reflecting mirrors, and light emitted from the other part of the solid state light sources is directly incident onto a second light combination element (which will be further described in the following) and/or a condenser lens (which will be further described in the following). In other words, the number of the second reflecting mirrors is preferably less than the number of the solid state light sources to save space and cost. In addition, the solid state light sources and the second reflecting mirrors may be further arranged in a one-to-one corresponding manner. However, this will be adverse to acquiring higher degree of luminance when the number of the solid state light sources is small. When the number of the solid state light sources is large, more reflecting mirrors need to be arranged, thus resulting in a large size of the optical fixing device 200, which in turn is adverse to the minimization of size of a light source device.

The second light combination element fixing part 240 is used for fixing at least one second light combination element. As a preferred embodiment, when the number of the solid state light sources is large, the solid state light sources are arranged to be close to one another, so as to reduce as much as possible the size of the optical fixing device 200. A projection of the second light combination element on an arrangement plane of the solid state light sources generally covers at least one solid state light source. Therefore, some light emitted from the solid state light sources covered by the projection is transmitted by the second light combination element, and some of the light emitted from the solid state light sources is first reflected by the second reflecting mirrors and then reflected by the second light combination element. However, it should be understood that when the number of the solid state light sources is small or the solid state light sources are spaced from one another with large gaps, the second light combination element can also merely transmit light of the solid state light sources that is not reflected, or merely reflect the light reflected by the first reflecting mirror.

The condenser lens fixing part 250 is used for fixing the condenser lens. The condenser lens converges the light passing through the second light combination element. It is easy to understand that the second light combination element is preferably arranged such that a center thereof is close to an optical axis of the condenser lens. In addition, when some light of the solid state light sources is not transmitted or reflected by the second light combination element but is emitted directly, the condenser lens also converges the directly emitted light.

In order to configure more fixed light sources, the optical fixing device 200 is provided with the first reflecting mirror fixing parts 220 opposite to the second reflecting mirror fixing parts 230. First reflecting mirrors fixed by the first reflecting mirror fixing parts 220 correspond to the solid state light sources in a one-to-one manner. The optical fixing device 200 further includes the first light combination element fixing part 260 used for fixing a first light combination element. The first light combination element further reflects the light reflected by the first reflecting mirrors to the second light combination element. The light is then transmitted by the second light combination element onto the condenser lens.

In order to configure more solid state light sources and arrange the optical elements reasonably, a plurality of second reflecting mirrors are arranged. In the horizontal direction, the first reflecting mirrors and the second reflecting mirrors are respectively located at the first side and the second side of the second light combination element. The first reflecting mirrors and the first light combination element located at the first side of the second light combination element are fixed to be respectively perpendicular to the second light combination element. The second reflecting mirrors located at the second side of the second light combination element are fixed to be parallel to the second light combination element. An acute angle between the second light combination element and a horizontal plane is 45°. By such an arrangement, the first reflecting mirrors and the second reflecting mirrors are respectively arranged oppositely to each other with respect to the second light combination element, such that light of solid state light sources far from the second light combination element and the condenser lens is reflected toward the second light combination element in the horizontal direction. Specifically, the first reflecting mirrors and the second reflecting mirrors located at the first side and the second side of the second light combination element reflect light emitted from the corresponding solid state light sources in the vertical direction and change the light into light in the horizontal direction, so that the light in the horizontal direction is further reflected by the second light combination element and by the first light combination element and then is further transmitted through the second light combination element, thus obtaining a plurality of parallel light rays incident onto the condenser lens vertically.

Other than fixing a third reflecting mirror on a component outside the optical fixing device 200, as a further optimization, the optical fixing device 200 further includes a third reflecting mirror fixing part 270 used for fixing a third reflecting mirror so as to ensure high accuracy of relative locations of optical elements. When the solid state light sources include RGB three-color LED light sources, in this case, the second light combination element may adopt a dichroic sheet. Mixed light obtained after light of the RGB three-color LED light sources is converged through the condenser lens is subsequently used as a projection light source. The third reflecting mirror reflects the mixed light and then the mixed light exits from the third reflecting mirror. In the case when the solid state light sources include laser light sources or RGB three-color LED light sources to serve as excitation light of the third reflecting mirror, so as to excite a wavelength conversion material to generate excited light, the second light combination element may include a polarizer. Therefore, in addition to the above third reflecting mirror fixing part 270, the optical fixing device 200 further includes a color wheel fixing part (not shown) used for fixing a color wheel as the wavelength conversion material. The third reflecting mirror reflects the converged excitation light to the color wheel, and the excited light generated by the wavelength conversion material and the excitation light not absorbed are subsequently mixed to serve as a projection light source. As such, by arranging the light source fixing parts 210, the first reflecting mirror fixing parts 220, the second reflecting mirror fixing parts 230, the second light combination element fixing part 240, the condenser lens fixing part 250, the first light combination element fixing part 260, the third reflecting mirror fixing part 270, and the optional color wheel fixing part on the optical fixing device 200 as a whole, the risk of increased relative location errors caused by respectively mounting the optical elements on different fixing components is reduced, and the production cost may further be reduced.

As another preferred embodiment, the third reflecting mirror fixing part 270 is provided with a rib extending toward the color wheel, and the third reflecting mirror fixed on the rib is oblique with respect to the color wheel. By arranging the third reflecting mirror obliquely with respect to the color wheel, the converged excitation light is reflected by the third reflecting mirror onto an excited surface of the color wheel in a smaller light spot, thus improving the excitation efficiency of the excitation light.

In at least one implementation, the optical fixing device 200 is arranged into an approximate funnel shape; that has one large end with the other end decreasing gradually, such that the optical fixing device 200 has a smaller size and shape on the premise of having a plurality of solid state light sources fixed and arranged in a straight line. Specifically, the light source fixing parts 210 are arranged at the funnel opening. The first reflecting mirror fixing parts 220 and the second reflecting mirror fixing parts 230 are respectively arranged on a pair of internal oblique surfaces of the funnel. The condenser lens fixing part 250 is arranged at the neck of the funnel. The first light combination element fixing part 260 and the second light combination element fixing part 240 are arranged between the funnel opening and the neck. The third reflecting mirror fixing part 270 and the color wheel fixing part are arranged at the end portion opposite to the funnel opening. In the horizontal direction, although the size of the end portion is larger than that of the neck, the size of the end portion is still smaller than that of the funnel opening. As a whole, the optical fixing device 200 is still similar to an inverted funnel shape, and the overall shape of the optical fixing device 200 is also compact. A plate 280 is arranged at the funnel opening, and a plurality of through holes 281 are provided on the plate 280. The solid state light sources are fixed in the through holes 281. Preferably, the plate 280 is a horizontal plane. Positioning planes of the plurality of through holes 281 for the solid state light sources are located on the same horizontal plane, thus ensuring the accurate positioning of the solid state light sources.

To obtain a better fixing effect of the optical elements, at least one of the first reflecting mirror fixing parts 220, the second reflecting mirror fixing parts 230, the third reflecting mirror fixing part 270, the first light combination element fixing part 260, and the second light combination element fixing part 240 includes at least two bosses 290, but preferably all of them each includes at least two bosses 290. A hollow portion 291 fillable with an adhesive is provided between every two adjacent bosses 290. Therefore, the hollow portion 291 provides sufficient space for filling of the adhesive, thus ensuring that enough adhesive is provided to fix the light source elements. Meanwhile, the bosses 290 can also provide a precise fixing reference plane for the optical elements and prevent the adhesive from overflowing.

The optical fixing devices 200 described in the above embodiments are preferably integrally formed. Specifically, the optical fixing device 200 is a structural part shaped by modeling or machining. The precision requirement for assembly positions of the optical elements can be met by merely assembling once in combination with machining of a CNC machining center. At least one manufacturing process of the optical fixing device 200 is illustrated in the following by using FIG. 3 as an example. First, the condenser lens fixing part 250 is used as a positioning base for processing a reference plane A of the light source fixing parts 210. Subsequently, fixing reference planes of the second light combination element fixing part 240, the first reflecting mirror fixing parts 220, the second reflecting mirror fixing parts 230, the first light combination element fixing part 260, and the third reflecting mirror fixing part 270 are processed. Finally, a fixing reference plane of the color wheel fixing part is processed. The size precision of the optical fixing device 200 for mounting and fixing optical devices can be well controlled by way of the processing precision of the computer numerical control (CNC) machining center itself, thus meeting the using requirement.

Figure 4:
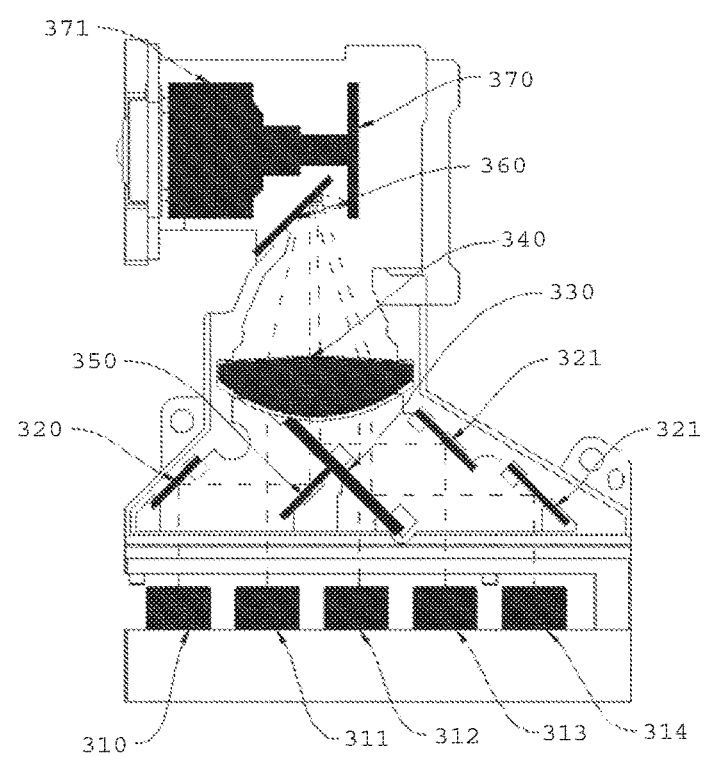
FIG. 4 is a schematic structural diagram of optical elements being fixed in a light source fixing device of a projection equipment according to the present disclosure.

In order to provide a more specific illustration of the present disclosure, the above embodiments are illustrated in detail in the following by using the five solid state light sources shown in FIG. 4 as an example and by referring to FIG. 2 and FIG. 3. Five through holes 281 are provided and opened on the plate 280 located at the funnel opening of the optical fixing device 200 in an approximate inverted funnel shape to serve as the light source fixing parts 210. One of five blue laser light sources 310, 311, 312, 313, and 314 is fixedly assembled in each of the five through holes 281. Preferably, the blue laser light sources 310, 311, and 312 have a first polarization state, and the blue laser light sources 313 and 314 have a second polarization state. The first reflecting mirror fixing parts 220 located on a left internal oblique surface and a right internal oblique surface of the optical fixing device 200 have one first reflecting mirror 320 and two second reflecting mirrors 321 fixedly assembled thereon, respectively. The second light combination element fixing part 240, the first light combination element fixing part 260, and the condenser lens fixing part 250 are arranged on a bottom wall connecting the left internal oblique surface and the right internal oblique surface. The condenser lens fixing part 250 is located above the second light combination element fixing part 240 and the first light combination element fixing part 260. That is, a condenser lens 340 is arranged approximately at the position of the neck of the funnel.

The second light combination element fixedly assembled on the second light combination element fixing part 240 includes a polarizer 330. A first surface of the polarizer 330 faces the second reflecting mirror 321. The first light combination element 350 faces the first reflecting mirror 320. The first light combination element 350 includes a reflecting mirror. An acute angle between the polarizer 330 and a horizontal plane is 45°. Moreover, the first reflecting mirror 320 and the first light combination element 350 are fixed to be respectively perpendicular to the polarizer 330.

Excitation light emitted from the blue laser light sources 313 and 314 in the vertical direction is horizontally reflected by the second reflecting mirror 321, and then further vertically reflected by the first surface of the polarizer 330. Excitation light emitted from the blue laser light source 310 in the vertical direction is horizontally reflected by the first reflecting mirror 320, and then vertically reflected by the first light combination element 350 to be further transmitted by a second surface of the polarizer 330 to enter the condenser lens 340. For the other blue laser light sources 311 and 312, the blue laser light source 312 is not reflected but is directly transmitted through the second surface of the polarizer 330 to enter the condenser lens 340, and the blue laser light source 311 which is not reflected or transmitted through the polarizer 330 is directly incident onto the condenser lens 340. Therefore, specific quantities and position settings of the light source fixing parts 210, the first reflecting mirror fixing parts 220, the second reflecting mirror fixing parts 230, the first light combination element fixing part 260, the polarizer fixing part 240, and the condenser lens fixing part 250 may be determined according to the quantity and arrangement of the blue laser light sources. For example, when the above blue laser light source 310 is removed, correspondingly, the first reflecting mirror fixing part 220 and a light combination element fixing part 260 are no longer required to be set. However, this reduces the quantity of the solid state light sources, thus being adverse to acquiring higher degree of lamination.

After the excitation light is incident onto the condenser lens 340 and is converged by the condenser lens 340, the converged excitation light is emitted to a third reflecting mirror 360. The third reflecting mirror 360 is fixed on a rib that extends from the left internal oblique surface toward the end portion opposite to the funnel opening and is used as the third reflecting mirror fixing part 270. The third reflecting mirror 360 extends towards a color wheel 370. The color wheel 370 is fixedly connected to a driving apparatus 371, and rotates and works under the drive of the driving apparatus 371. Moreover, the driving apparatus 371 is fixed by a shaft sleeve-shaped opening at the end portion, thus fixing the color wheel 370. The excitation light reflected by the third reflecting mirror 360 is emitted onto an excited surface of the color wheel 370 in a smaller light spot. The excited surface is uniformly coated with a wavelength conversion material, e.g., GRBW four-color phosphor powder. Therefore, the phosphor powder generates excited light under excitation of the blue laser, and the excited light is mixed to form a projection light source used subsequently.

Preferably, the first reflecting mirror fixing parts 220, the second reflecting mirror fixing parts 230, the first light combination element fixing part 260, the third reflecting mirror fixing part 270, and the polarizer fixing part 240 each includes at least two bosses 290. A hollow portion 291 fillable with an adhesive is arranged between two adjacent bosses 290. The at least two bosses 290 of each fixing part jointly form a fixing reference surface used for fixing a corresponding optical element.

The present disclosure further provides a projection equipment, especially a miniature projection equipment of which the size is required to be as small as possible. The projection equipment includes the optical fixing device 200 described in any of the above embodiments. With reference to advantages possessed by the optical fixing device 200 described above, the size of the projection equipment is reduced correspondingly as the size of the optical fixing device 200 is compact. The accuracy of relative locations of optical elements fixed in the optical fixing device 200 is high, thus improving the quality of an image projected by the projection equipment. In addition, the production cost of the projection equipment is also reduced accordingly.

In an embodiment, a light source device includes a light source queue, a condensing system, a third reflecting mirror, and a wavelength conversion device, the wavelength conversion device including a color wheel and a driving apparatus, wherein the light source queue is formed with a plurality of light sources arranged in a straight line;

the condensing system is located in a light exit direction of the light source queue and condenses light emitted from the light source queue onto the third reflecting mirror;

the third reflecting mirror reflects the condensed light to the color wheel;

the color wheel generates excited light after being excited by the light reflected by the third reflecting mirror;

the driving apparatus comprises a driving part and a rotation shaft, wherein the rotation shaft is fixedly connected to the color wheel, and the driving part drives the rotation shaft to rotate, so as to drive the color wheel to rotate; and the rotation shaft of the driving apparatus is parallel to the light source queue. The rotation shaft of the driving apparatus being parallel to the light source queue can be understood as that the rotation shaft of the driving apparatus is approximately parallel to the light source queue.

The direction of the rotation shaft is the direction of a central axis of the driving apparatus, and is also the direction of a central axis of the wavelength conversion device.

The light source queue is in a straight line shape having a long length. Therefore, in this embodiment, the rotation shaft of the driving apparatus is approximately parallel to the straight line-shaped light source queue. Elements are arranged in a direction parallel to the light source queue rather than in other directions in the three-dimensional space, meeting the characteristic of the long straight line-shaped light source queue. Therefore, the volume of an external cuboid of the light source device can be reduced. The external cuboid of the light source device refers to the minimum cuboid that can enclose the light source device. It is easy to understand that the volume of a shell for fixing or accommodating the light source device can be thus reduced.

In an embodiment, light emitted from the light source queue is converged onto the third reflecting mirror approximately on the same plane, and light paths formed by the light emitted from the light source queue and incident onto the third reflecting mirror are approximately on the same plane. Alternatively, the formed light paths are approximately located on planes that are parallel to each other at small distances, e.g., less than 1 cm. Alternatively, the formed light paths are approximately located on planes that intersect with one another with small included angles, e.g., less than 30 degrees.

In an embodiment, more than 50% of the projection of the wavelength conversion device on the straight line where the light source queue is located overlaps with the light source queue. In this embodiment, the length of the light source device in the direction of the light source queue is reduced.

In an embodiment, the projection of the wavelength conversion device on the straight line where the light source queue is located is approximately located on the light source queue.

In an embodiment, the color wheel is perpendicular to the rotation shaft, and an intersection of the plane where the color wheel is located and the light source queue is located in the middle of the light source queue.

In an embodiment, the third reflecting mirror and the driving apparatus are located at the same side of the color wheel. This embodiment can prevent an increase of the length of the light source device in the direction of the rotation shaft due to overlapping of the length of the wavelength conversion device and the distance from the third reflecting mirror to the color wheel, thus being conducive to the reducing of the volume of light source conversion. Moreover, the light reflected back by the color wheel can still be reflected to the color wheel by the third reflecting mirror, thus increasing the utilization of light.

In an embodiment, the rotation shaft is slimmer than the driving part, and the third reflecting mirror is at least partially located in a space enclosed by the driving part, the rotation shaft, and the color wheel. In this embodiment, the space enclosed by the driving part, the rotation shaft, and the color wheel is utilized effectively, and the length of the light source device in the light exit direction of the light source queue is reduced. Therefore, the volume of the light source device can be reduced.

In an embodiment, the light source queue comprises a first light source and a second light source. The first light source emits first light, and the second light source emits second light. The number of the first light sources is greater than or equal to one, and the number of the second light sources is greater than or equal to one;

The condensing system comprises a second light combination element, a second reflecting mirror, and a condenser lens. The second light combination element is located on an emission light path of at least one of the first light sources, and the second reflecting mirror is arranged beside the second light combination element. The second light combination element has a characteristic of transmitting the first light and reflecting the second light, and the second light combination element combines the first light and the second light incident thereon.

The first light emitted from at least one of the first light sources directly transmits through the second light combination element, and the second light emitted from at least one of the second light sources is reflected by the second reflecting mirror onto the second light combination element, and is then reflected by the second light combination element to the condenser lens. The condenser lens is located on an emission light path of the second light combination element, and the condenser lens converges light incident thereon to the third reflecting mirror.

In this embodiment, the second light combination element is located on the emission light path of at least one of the first light sources, and the first light combination transmits the first light incident thereon. Therefore, empty space without light sources arranged at relative locations of the light source queue and the second light combination element can be avoided, thus implementing close arrangement of light sources on the light source queue.

In an embodiment, the number of the second reflecting mirrors is greater than one. The second reflecting mirrors are arranged into a second reflecting mirror array in a step shape, wherein each of the second reflecting mirrors is arranged in accordance with one of the second light sources to reflect the second light emitted from the corresponding second light source onto the second light combination element, and the second reflecting mirror array gradually gets closer to the second light combination element along the light exit direction of the light source queue.

The emitted second light that is reflected by the second reflecting mirrors onto the second light combination element is arranged at the tail or the head of the light source queue rather than in the middle of the light source queue. It can be understood that if there are a plurality of such second light sources, the second light sources are centrally arranged or successively arranged at the tail or head of the light source queue.

In an embodiment, the condensing system further includes a first reflecting mirror and a first light combination element. The first reflecting mirror is arranged beside the second light combination element, and the second reflecting mirror is arranged at the opposite side of the second light combination element. The first light combination element and the second light combination element are cross-arranged, wherein the first light combination element and the first reflecting mirror are located at the same side of the second light combination element, and the first light combination element is arranged between two emission light paths of light sources in the light source queue, without blocking the emission of the first light of the first light source. The first light combination element has a characteristic of reflecting the first light. The first light emitted from at least one of the first light sources passes through the first reflecting mirror and is reflected onto the first light combination element, and is further reflected by the first light combination element onto the condenser lens.

The emitted first light that is reflected by the first reflecting mirrors onto the first light combination element is arranged at the tail or the head of the light source queue rather than in the middle of the light source queue. It can be understood that if there are a plurality of such first light sources, the first light sources are centrally arranged or successively arranged at the tail or head of the light source queue.

In this embodiment, the first light emitted from some of the first light sources (e.g., the first light sources at the tail or head of the light source queue) is reflected by the first reflecting mirror onto the first light combination element, and the light spot emitted from the light source queue arranged in a straight line can be reduced.

Moreover, in this embodiment, the first light combination element is arranged between two emission light paths of the light sources in the light source queue, and light emission of the light source queue will not be blocked, such that light sources can be arranged in the light source queue at relative locations of the second light combination element, thus being conducive to compact arrangement of light sources in the light source queue.

In addition, the first light combination element reflects the light of the first reflecting mirror, and is arranged between two emission light paths of the light sources in the light source queue. Therefore, it is convenient to arrange a support at one side of the first light combination element facing the light source queue, so as to support and fix the first light combination element and the second light combination element. The support can support and fix the total area of the reverse surface of a reflection surface of the first light combination element, and support and fix a small part of the area of the second light combination element, as long as light emission of the light source queue is not blocked.

In an embodiment, the first light combination element and the second light combination element are arranged into a T shape. The T shape includes two right angles, and one of the right angles faces the light source queue.

In an embodiment, the number of the first reflecting mirrors is greater than one. The first reflecting mirrors are arranged into a first reflecting mirror array in a step shape, wherein each of the first reflecting mirrors is arranged in accordance with one of the first light sources to reflect the first light emitted from the corresponding first light source onto the first light combination element, and the first reflecting mirror array gradually gets closer to the first light combination element along the light exit direction of the light source queue.

In an embodiment, the first light source further comprises a light source that emits first light from a channel between the first reflecting mirror and the first light combination element. The first light emitted from the light source is transmitted by the second light combination element and is incident onto the condenser lens, or is not transmitted by the second light combination element but is directly incident onto the condenser lens.

In some miniature projection equipments, the light source device needs to meet the requirement of a small volume, and the length of the straight line-shaped light source array may not exceed 5 cm even though including five light sources. The light source device includes many optical elements, and therefore, many optical elements need to be distributed within a small space. Moreover, some space needs to be reversed for operations such as adhering/fixing the optical elements. This embodiment helps to meet these requirements.

In an embodiment, the first light emitted from the first light source and the second light emitted from the second light source have different polarization states. The second light combination element is a polarizer transmitting one of the first light and second light in a polarization state while reflecting the light in the other polarization state.

In an embodiment, a light source device includes:

a light source queue, formed by a plurality of light sources arranged in a straight line, the light source queue comprising a first light source and a second light source, the first light source emitting first light and the second light source emitting second light;

a first light combination element and a second light combination element, the first light combination element having a characteristic of reflecting the first light, and the second light combination element having a characteristic of transmitting the first light and reflecting the second light;

the second light combination element being arranged on an emission light path of at least one of the first light sources in the middle of the light source queue, and transmitting the first light emitted from the at least one of the first light sources to a condenser lens;

the first light combination element and the second light combination element being cross-arranged, and the first light combination element being arranged between two emission light paths of light sources in the light source queue, without blocking the light emission of the light source queue;

a first reflecting mirror, arranged at first sides of the first light combination element and the second light combination element, and the first reflecting mirror and the first light combination element are located at the same side of the second light combination element, and used for reflecting first light emitted from at least one first light source located at a first end of the light source queue onto the first light combination element, the first light combination element reflecting the first light onto the condenser lens;

a second reflecting mirror, arranged at second sides of the first light combination element and the second light combination element, and used for reflecting second light emitted from at least one second light source located at a second end of the light source queue onto the second light combination element, the second light combination element reflecting the second light onto the condenser lens; and the condenser lens, used for condensing the light incident thereon.

In this embodiment, the first reflecting mirror and the second reflecting mirror respectively reflect the first light and the second light located at two ends of the light source queue onto the first light combination element and the second light combination element, and further reflect the first light and the second light onto the condenser lens. As such, the size of the light spot incident onto the condenser lens can be reduced. The first light combination element is arranged between two emission light paths of the light sources in the light source queue, without blocking light emission of the light source queue. Therefore, at least one of the first light sources located in the middle of the light source queue can be transmitted through the second light combination element and then being incident onto the condenser lens. Therefore, empty space without light sources arranged at relative locations of the light source queue and the second light combination element can be avoided, thus implementing close arrangement of light sources on the light source queue.

In an embodiment, the number of the second reflecting mirrors is greater than one, and the second reflecting mirrors are arranged into a second reflecting mirror array in a step shape, wherein each of the second reflecting mirrors is arranged in accordance with one of the second light sources to reflect the second light emitted from the corresponding second light source onto the second light combination element, and the second reflecting mirror array gradually gets closer to the second light combination element along the light exit direction of the light source queue.

In an embodiment, the number of the first reflecting mirrors is greater than one, and the first reflecting mirrors are arranged into a first reflecting mirror array in a step shape, wherein each of the first reflecting mirrors is arranged in accordance with one of the first light sources to reflect the first light emitted from the corresponding first light source onto the first light combination element, and the first reflecting mirror array gradually gets closer to the first light combination element along the light exit direction of the light source queue.

In an embodiment, the first light combination element and the second light combination element are arranged into a T shape.

In an embodiment, the first light source further comprises a light source that emits first light from a channel between the first reflecting mirror and the first light combination element. The first light emitted from the light source is transmitted by the second light combination element and is incident onto the condenser lens, or is not transmitted by the second light combination element but is directly incident onto the condenser lens.

In some miniature projection equipments, the light source device needs to meet the requirement of a small volume, and the length of the straight line-shaped light source array may not exceed 5 cm even though including five light sources. The light source device includes many optical elements, and therefore, many optical elements need to be distributed within a small space. Moreover, some space needs to be reversed for operations such as adhering/fixing the optical elements. This embodiment helps to meet these requirements.

In an embodiment, the first light emitted from the first light source and the second light emitted from the second light source have different polarization states. The second light combination element is a polarizer transmitting one of the first light and second light in a polarization state while reflecting the light in the other polarization state.

A light source device in an embodiment provided in this disclosure is illustrated in the following with reference to FIG. 4.

In an embodiment, a light source device includes first light sources 310, 311, and 312, and second light sources 313 and 314. The device further includes a first light combination element 350, a second light combination element 330, a first reflecting mirror 320, two second reflecting mirrors 321, a condenser lens 340, a third reflecting mirror 360, and a wavelength conversion device. The wavelength conversion device includes a driving apparatus 371 and a color wheel 370.

The first light sources 310, 311, and 312 emit first light in a first polarization state (e.g., an S polarization state), and the second light sources 313 and 314 emit second light in a second polarization state (e.g., a P polarization state). The first polarization state is different from the second polarization state. The first light sources 310, 311, and 312 and the second light sources 313 and 314 are all blue laser light sources.

The light sources are arranged into a straight line-shaped light source queue. The first light source 310, the first light source 311, and the first light source 312 are arranged successively. The second light source 313 and the second light source 314 are arranged successively.

In this embodiment, the second light combination element 330 is a polarizer. The polarizer 330 is arranged on an emission light path of the first light source 312, and transmits the first light emitted from the first light source 312 onto the condenser lens 340. The second light combination element 330 is arranged to form an angle of 45 degrees with the light source queue.

The first light combination element 350 is a reflecting mirror, and is arranged to form a T shape with the second light combination element 330. The first light combination element 350 intersects with the second light combination element 330 in the middle of the second light combination element. The first light combination element 350 is arranged between emission light paths of the first light source 311 and the first light source 312, without blocking the light emission of the first light source 311 and the first light source 312.

The first reflecting mirror 320 reflects the first light emitted from the first light source 310 onto the first light combination element 350, and the first light combination element 350 reflects the first light onto the condenser lens 340.

The two second reflecting mirrors 321 respectively reflect the second light emitted from the second light source 313 and the second light source 314 onto the second light combination 330, and the second light combination element reflects the second light onto the condenser lens 340.

The two second reflecting mirrors 321 are arranged into a second reflecting mirror array in a step shape. The second reflecting mirror array gradually gets closer to the second light combination element along the light exit direction of the light source queue.

The first light emitted from the first light source 311 passes through a channel between the first reflecting mirror 320 and the first light combination element 350, and is incident to the condenser lens 340.

The condenser lens 340 converges the incident light thereon onto the third reflecting mirror 360. The light exit direction of the condenser lens 340 is approximately the same as the light exit direction of the light source queue.

The third reflecting mirror 360 reflects the converged light to the color wheel 370, and excites a wavelength conversion material on 370 to generate excited light.

The driving apparatus 371 includes a driving part and a rotation shaft. The rotation shaft is fixedly connected to the color wheel 370. The driving part drives the rotation shaft to rotate, thus driving the color wheel 370 to rotate.

The rotation shaft of the driving apparatus 371 is parallel to the light source queue.

The third reflecting mirror 360 and the driving apparatus 371 are located at the same side of the color wheel 370.

The rotation shaft is slimmer than the driving part. The third reflecting mirror 360 is at least partially located in the space enclosed by the driving part, the rotation shaft, and the color wheel 370.

A projection of the wavelength conversion device on the straight line where the light source queue is located is approximately located on the light source queue.

Among a light source queue, a condensing system, a third reflecting mirror, and a wavelength conversion device, the wavelength conversion device includes a color wheel and a driving apparatus, wherein:

the light source queue is formed with a plurality of light sources arranged in a straight line;

the condensing system is located in a light exit direction of the light source queue and condenses light emitted from the light source queue onto the third reflecting mirror;

the third reflecting mirror reflects the condensed light to the color wheel;

the color wheel generates excited light after being excited by the light reflected by the third reflecting mirror;

the driving apparatus comprises a driving part and a rotation shaft, wherein the rotation shaft is fixedly connected to the color wheel, and the driving part drives the rotation shaft to rotate, so as to drive the color wheel to rotate; and the rotation shaft of the driving apparatus is parallel to the light source queue. The rotation shaft of the driving apparatus being parallel to the light source queue can be understood as that the rotation shaft of the driving apparatus is approximately parallel to the light source queue.

The direction of the rotation shaft is the direction of a central axis of the driving apparatus, and is also the direction of a central axis of the wavelength conversion device.

The light source queue is in a straight line shape having a long length; therefore, in this embodiment, the rotation shaft of the driving apparatus is approximately parallel to the straight line-shaped light source queue. Elements are arranged in a direction parallel to the light source queue rather than in other directions in the three-dimensional space, meeting the characteristic of the long straight line-shaped light source queue. Therefore, the volume of an external cuboid of the light source device can be reduced. The external cuboid of the light source device refers to the minimum cuboid that can enclose the light source device. It is easy to understand that the volume of a shell for fixing or accommodating the light source device can be thus reduced.

In an embodiment, light emitted from the light source queue is converged onto the third reflecting mirror approximately on the same plane, and light paths formed by the light emitted from the light source queue and incident onto the third reflecting mirror are approximately on the same plane. Alternatively, the formed light paths are approximately located on planes that are parallel to each other at small distances, e.g., less than 1 cm. Alternatively, the formed light paths are approximately located on planes that intersect with one another with small included angles, e.g., less than 30 degrees.

In an embodiment, more than 50% of the projection of the wavelength conversion device on the straight line where the light source queue is located overlaps with the light source queue. In this embodiment, the length of the light source device in the direction of the light source queue is reduced.

In an embodiment, the projection of the wavelength conversion device on the straight line where the light source queue is located is approximately located on the light source queue.

In an embodiment, the color wheel is perpendicular to the rotation shaft, and an intersection of the plane where the color wheel is located and the light source queue is located in the middle of the light source queue.

In an embodiment, the third reflecting mirror and the driving apparatus are located at the same side of the color wheel. This embodiment can prevent an increase of the length of the light source device in the direction of the rotation shaft due to overlapping of the length of the wavelength conversion device and the distance from the third reflecting mirror to the color wheel, thus being conducive to the reducing of the volume of light source conversion. Moreover, the light reflected back by the color wheel can still be reflected to the color wheel by the third reflecting mirror, thus increasing the utilization of light.

In an embodiment, the rotation shaft is slimmer than the driving part, and the third reflecting mirror is at least partially located in a space enclosed by the driving part, the rotation shaft, and the color wheel. In this embodiment, the space enclosed by the driving part, the rotation shaft, and the color wheel is utilized effectively, and the length of the light source device in the light exit direction of the light source queue is reduced. Therefore, the volume of the light source device can be reduced.

In an embodiment, the light source queue comprises a first light source and a second light source, the first light source emits first light, the second light source emits second light, the number of the first light sources is greater than or equal to one, and the number of the second light sources is greater than or equal to one.

The condensing system comprises a second light combination element, a second reflecting mirror, and a condenser lens.

The second light combination element is located on an emission light path of at least one of the first light sources, and the second reflecting mirror is arranged beside the second light combination element.

The second light combination element has a characteristic of transmitting the first light and reflecting the second light, and the second light combination element combines the first light and the second light incident thereon.

The first light emitted from at least one of the first light sources directly transmits through the second light combination element, and the second light emitted from at least one of the second light sources is reflected by the second reflecting mirror onto the second light combination element, and is then reflected by the second light combination element to the condenser lens.

The condenser lens is located on an emission light path of the second light combination element, and the condenser lens converges light incident thereon to the third reflecting mirror.

In this embodiment, the second light combination element is located on the emission light path of at least one of the first light sources, and the first light combination transmits the first light incident thereon. Therefore, empty space without light sources arranged at relative locations of the light source queue and the second light combination element can be avoided, thus implementing close arrangement of light sources on the light source queue.

In an embodiment, the number of the second reflecting mirrors is greater than one, and the second reflecting mirrors are arranged into a second reflecting mirror array in a step shape, wherein each of the second reflecting mirrors is arranged in accordance with one of the second light sources to reflect the second light emitted from the corresponding second light source onto the second light combination element, and the second reflecting mirror array gradually gets closer to the second light combination element along the light exit direction of the light source queue.

The emitted second light that is reflected by the second reflecting mirrors onto the second light combination element is arranged at the tail or the head of the light source queue rather than in the middle of the light source queue. It can be understood that if there are a plurality of such second light sources, the second light sources are centrally arranged or successively arranged at the tail or head of the light source queue.

In an embodiment, the condensing system further includes a first reflecting mirror and a first light combination element. The first reflecting mirror is arranged beside the second light combination element, and the second reflecting mirror is arranged at the opposite side of the second light combination element.

The first light combination element and the second light combination element are cross-arranged, wherein the first light combination element and the first reflecting mirror are located at the same side of the second light combination element, and the first light combination element is arranged between two emission light paths of light sources in the light source queue, without blocking the emission of the first light of the first light source. The first light combination element has a characteristic of reflecting the first light.

The first light emitted from at least one of the first light sources passes through the first reflecting mirror and is reflected onto the first light combination element, and is further reflected by the first light combination element onto the condenser lens.

The emitted first light that is reflected by the first reflecting mirrors onto the first light combination element is arranged at the tail or the head of the light source queue rather than in the middle of the light source queue. It can be understood that if there are a plurality of such first light sources, the first light sources are centrally arranged or successively arranged at the tail or head of the light source queue.

In this embodiment, the first light emitted from some of the first light sources (e.g., the first light sources at the tail or head of the light source queue) is reflected by the first reflecting mirror onto the first light combination element, and the light spot emitted from the light source queue arranged in a straight line can be reduced.

Moreover, in this embodiment, the first light combination element is arranged between two emission light paths of the light sources in the light source queue, and light emission of the light source queue will not be blocked, such that light sources can be arranged in the light source queue at relative locations of the second light combination element, thus being conducive to compact arrangement of light sources in the light source queue.

In addition, the first light combination element reflects the light of the first reflecting mirror, and is arranged between two emission light paths of the light sources in the light source queue. Therefore, it is convenient to arrange a support at one side of the first light combination element facing the light source queue, so as to support and fix the first light combination element and the second light combination element. The support can support and fix the total area of the reverse surface of a reflection surface of the first light combination element, and support and fix a small part of the area of the second light combination element, as long as light emission of the light source queue is not blocked.

In an embodiment, the first light combination element and the second light combination element are arranged into a T shape. The T shape includes two right angles, and one of the right angles faces the light source queue.

In an embodiment, the number of the first reflecting mirrors is greater than one, and the first reflecting mirrors are arranged into a first reflecting mirror array in a step shape, wherein each of the first reflecting mirrors is arranged in accordance with one of the first light sources to reflect the first light emitted from the corresponding first light source onto the first light combination element, and the first reflecting mirror array gradually gets closer to the first light combination element along the light exit direction of the light source queue.

In an embodiment, the first light source further comprises a light source that emits first light from a channel between the first reflecting mirror and the first light combination element. The first light emitted from the light source is transmitted by the second light combination element and is incident onto the condenser lens, or is not transmitted by the second light combination element but is directly incident onto the condenser lens.

In some miniature projection equipments, the light source device needs to meet the requirement of a small volume, and the length of the straight line-shaped light source array may not exceed 5 cm even though including five light sources. The light source device includes many optical elements, and therefore, many optical elements need to be distributed within a small space. Moreover, some space needs to be reversed for operations such as adhering/fixing the optical elements. This embodiment helps to meet these requirements.

In an embodiment, the first light emitted from the first light source and the second light emitted from the second light source have different polarization states. The second light combination element is a polarizer transmitting one of the first light and second light in a polarization state while reflecting the light in the other polarization state.

In the above description, it should be understood that orientations or position relationships indicated by terms such as "upper", "lower", "left", "right", "vertical", "horizontal", and "bottom" are on the basis of the orientations or position relationships shown in the accompanying drawings, and are merely used for simplifying the description. They are not intended to indicate or imply that the referred apparatus or element must have the specific orientations and must be constructed and operated in the specific orientations, and thus should not be construed as limiting the present disclosure.

Moreover, terms "first" and "second" are merely used for description purposes, and should not be construed as indicating or implying relative importance or implicitly show the number of the indicated technical features. Therefore, the features defined by "first" and "second" can explicitly or implicitly include one or more of the features. In the description of the present disclosure, "a plurality of" means two or more, unless otherwise specified.

The above content is a further-detailed description of the present invention with reference to specific implementations, and it should not be considered that specific implementations of the present disclosure are merely limited by these illustrated implementations. Those of ordinary skill in the art of the present disclosure can further make several simple inference or variation under the premise of not departing from the concept of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical fixing device, comprising:
light source fixing parts configured to fix a plurality of solid state light sources;
second reflecting mirror fixing parts arranged in accordance with at least part of the plurality of solid state light sources, the second reflecting mirror fixing parts being configured to fix second reflecting mirrors;
a second light combination element fixing part configured to fix at least one second light combination element, wherein the second light combination element is used for transmitting some light emitted from the solid state light sources and is not reflected and/or is used for reflecting light reflected by the second reflecting mirrors; and
a condenser lens fixing part configured to fix a condenser lens, the condenser lens being configured to converge the light passing through the second light combination element;
a first reflecting mirror fixing part configured to fix a first reflecting mirror; and
a first light combination element fixing part configured to fix a first light combination element, wherein the first light combination element further reflects light reflected by the first reflecting mirror to the second light combination element,
wherein there are a plurality of second reflecting mirrors, and the light source fixing parts are arranged in a horizontal direction on a horizontal plane; and
wherein in the horizontal direction, the first reflecting mirror and the first light combination element located at a first side of the second light combination element are fixed to be perpendicular to the second light combination element respectively, and the second reflecting mirrors located at a second side of the second light combination element are fixed to be parallel to the second light combination element, and the angle between the second light combination element and the horizontal plane is 45°.

2. The optical fixing device according to claim 1, wherein the optical fixing device further comprises a third reflecting mirror fixing part configured to fix a third reflecting mirror and a color wheel fixing part configured to fix a color wheel, wherein the third reflecting mirror reflects the converged laser light to the color wheel to excite a wavelength conversion material of the color wheel, and wherein the solid state light sources are laser light sources or LED light sources.

3. The optical fixing device according to claim 2, wherein at least one of the first reflecting mirror fixing part, the second reflecting mirror fixing part, the third reflecting mirror fixing part, the first light combination element fixing part, and the second light combination element fixing part comprises at least two bosses, and a hollow portion fillable with an adhesive is provided between the adjacent bosses.

4. A projection equipment, wherein the projection equipment comprises the optical fixing device according to claim 1.

5. A light source device, comprising a light source queue, a condensing system, a third reflecting mirror, and a wavelength conversion apparatus, the wavelength conversion apparatus comprising a color wheel and a driving apparatus, wherein:
the light source queue is formed with a plurality of light sources arranged in a straight line;
the condensing system is located in a light exit direction of the light source queue and condenses light emitted from the light source queue onto the third reflecting mirror;
the third reflecting mirror reflects the condensed light to the color wheel;
the color wheel generates excited light after being excited by the light reflected by the third reflecting mirror;
the driving apparatus comprises a driving part and a rotation shaft, wherein the rotation shaft is fixedly connected to the color wheel, and the driving part drives the rotation shaft to rotate, so as to drive the color wheel to rotate; and
the rotation shaft of the driving apparatus is parallel to the light source queue;
and further wherein:
the light source queue comprises a first light source and a second light source, the first light source emits first light, the second light source emits second light, the number of the first light sources is greater than or equal to one, and the number of the second light sources is greater than or equal to one,
the condensing system comprises a second light combination element, a second reflecting mirror, and a condenser lens;
the second light combination element is located on an emission light path of at least one of the first light sources, and the second reflecting mirror is arranged beside the second light combination element;
the second light combination element has a characteristic of transmitting the first light and reflecting the second light, and the second light combination element combines the first light and the second light incident thereon;
the first light emitted from at least one of the first light sources directly transmits through the second light combination element, and the second light emitted from at least one of the second light sources is reflected by the second reflecting mirror onto the second light combination element, and is then reflected by the second light combination element to the condenser lens, and
the condenser lens is located on an emission light path of the second light combination element, and the condenser lens converges light incident thereon to the third reflecting mirror.

6. The light source device according to claim 5, wherein the number of the second reflecting mirrors is greater than one, and the second reflecting mirrors are arranged into a second reflecting mirror array in a step shape, wherein each of the second reflecting mirrors is arranged in accordance with one of the second light sources to reflect the second light emitted from the corresponding second light source onto the second light combination element, and the second reflecting mirror array gradually gets closer to the second light combination element along the light exit direction of the light source queue.

7. The light source device according to claim 5, wherein the condensing system further comprises a first reflecting mirror and a first light combination element;

the first reflecting mirror is arranged beside the second light combination element, and the second reflecting mirror is arranged at the opposite side of the second light combination element;

the first light combination element and the second light combination element are cross-arranged, wherein the first light combination element and the first reflecting mirror are located at the same side of the second light combination element, and the first light combination element is arranged between two emission light paths of light sources in the light source queue, without blocking the light emission of the light source queue, and the first light combination element has a characteristic of reflecting the first light; and the first light emitted from at least one of the first light sources passes through the first reflecting mirror and is reflected onto the first light combination element, and is further reflected by the first light combination element onto the condenser lens.

8. The light source device according to claim 5, wherein the first light emitted from the first light source and the second light emitted from the second light source have different polarization states; and the second light combination element is a polarizer transmitting one of the first light and second light in a polarization state while reflecting the light in the other polarization state.

9. A light source device, comprising:

a light source queue, formed by a plurality of light sources arranged in a straight line, wherein the light source queue comprises a first light source and a second light source, the first light source emitting first light and the second light source emitting second light;

a first light combination element and a second light combination element, the first light combination element having a characteristic of reflecting the first light, and the second light combination element having a characteristic of transmitting the first light and reflecting the second light;

the second light combination element being arranged on an emission light path of at least one of the first light sources in the middle of the light source queue, and transmitting the first light emitted from the at least one of the first light sources to a condenser lens;

the first light combination element and the second light combination element being cross-arranged, and the first light combination element being arranged between two emission light paths of light sources in the light source queue, without blocking the light emission of the light source queue;

a first reflecting mirror, arranged at first sides of the first light combination element and the second light combination element, and the first reflecting mirror and the first light combination element are located at the same side of the second light combination element, and used for reflecting first light emitted from at least one first light source located at a first end of the light source queue onto the first light combination element, the first light combination element reflecting the first light onto the condenser lens;

a second reflecting mirror, arranged at second sides of the first light combination element and the second light combination element, and used for reflecting second light emitted from at least one second light source located at a second end of the light source queue onto the second light combination element, the second light combination element reflecting the second light onto the condenser lens; and the condenser lens used for condensing the light incident thereon.

10. The light source device according to claim 9, wherein the number of the first reflecting mirrors is greater than one, the first reflecting mirrors are arranged into a first reflecting mirror array in a step shape, each of the first reflecting mirrors is arranged in accordance with one of the first light sources to reflect the first light emitted from the corresponding first light source onto the first light combination element, and the first reflecting mirror array gradually gets closer to the first light combination element along the light exit direction of the light source queue.

11. An optical fixing device, comprising:

light source fixing parts configured to fix a plurality of solid state light sources;

second reflecting mirror fixing parts arranged in accordance with at least part of the plurality of solid state light sources, the second reflecting mirror fixing parts being configured to fix second reflecting mirrors;

a second light combination element fixing part configured to fix at least one second light combination element, wherein the second light combination element is used for transmitting some light emitted from the solid state light sources and is not reflected and/or is used for reflecting light reflected by the second reflecting mirrors; and a condenser lens fixing part configured to fix a condenser lens, the condenser lens being used for converging the light passing through the second light combination element, wherein:

the optical fixing device further comprises a third reflecting mirror fixing part configured to fix a third reflecting mirror and a color wheel fixing part configured to fix a color wheel, the third reflecting mirror reflects the converged laser light to the color wheel to excite a wavelength conversion material of the color wheel, the solid state light sources are laser light sources or LED light sources, and at least one of the first reflecting mirror fixing part, the second reflecting mirror fixing part, the third reflecting mirror fixing part, the first light combination element fixing part, and the second light combination element fixing part comprises at least two adjacent bosses, and a hollow portion fillable with an adhesive is provided between the adjacent bosses.

* * * * *